T. FAIRBANKS.
Platform Scales.
No. 6,895.  Patented Nov. 20, 1849.
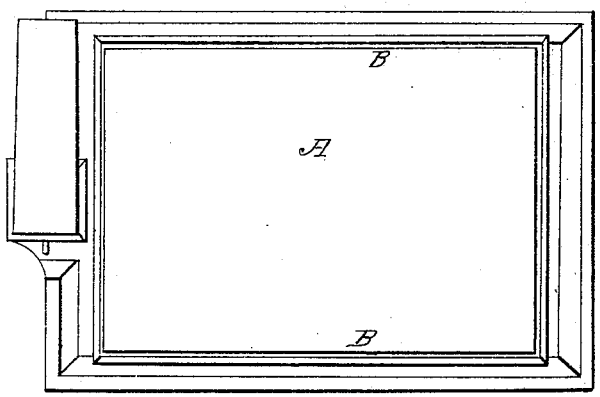
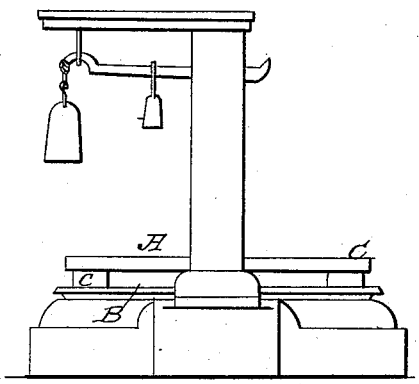
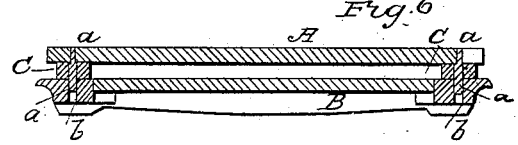
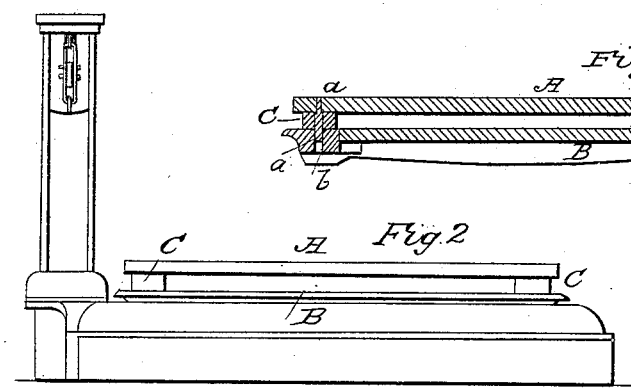
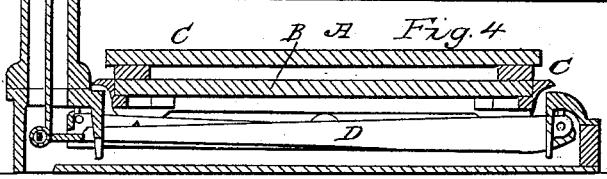
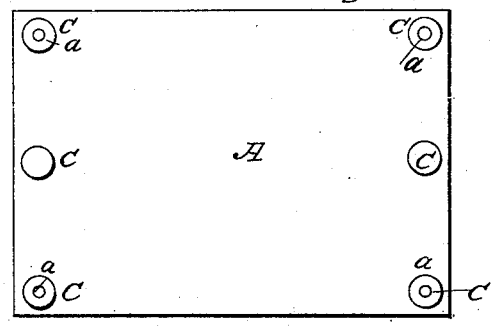

UNITED STATES PATENT OFFICE.

THADDEUS FAIRBANKS, OF ST. JOHNSBURY, VERMONT.

PLATFORM-SCALE.

Specification of Letters Patent No. 6,895, dated November 20, 1849.

*To all whom it may concern:*

Be it known that I, THADDEUS FAIRBANKS, of St. Johnsbury, in the county of Caledonia and State of Vermont, have invented a new and useful Improvement in Platform-Scales for Weighing Bars or Pigs of Iron or Such Like Ponderable Bodies; and I do hereby declare that the same is fully described and represented in the following specification and accompanying drawings, letters, figures and references thereof.

Of the said drawings, Figure 1, denotes a top view of my improved platform scale. Fig. 2, is a side elevation of it. Fig. 3, is an end elevation of it. Fig. 4 is a central vertical and longitudinal section of it. Fig. 5, is an underside view of the additional platform and its spring blocks. Fig. 6, is vertical section of the two platforms taken through the spring blocks.

In large platform scales or those adapted to weighing heavy pigs or bars of iron it has been found that the concussion produced by throwing the pigs or bars on the platform injuriously affects the bearings or pivots of the weighing levers. In order to obviate this difficulty I provide the scale with a secondary platform A, Figs. 1, 2, 3, 4, 5, 6, placed when in use at about one or two inches or at some proper distance above the main and usual weighing platform B. Between the two platforms and attached to the superior one, I place at suitable distances apart, blocks or pieces c, c, c, c, of vulcanized india rubber, allowing them to rest on the inferior platform B, while the superior platform A, is supported by and on them. Other suitable elastic material or contrivances may be substituted for the said blocks of rubber.

The weighing apparatus or supporting levers of the main platform are seen at D, underneath the main platform. They together with the rest of the weighing apparatus and the main platform do not differ in their construction from those in common use. There is therefore no necessity of any further description of them being herein given.

In order to keep the upper platform in place on the inferior one each of the corner spring blocks may have a stud, a, projecting downward from it, and made to enter a hole or socket b, formed down in the main platform as seen in Fig. 6.

The main platform in this case may or may not be used for weighing. I generally construct the scale in such manner that on removal of the upper platform and bringing the steelyard balance into equilibrium, the said lower platform may be used without the superior one. The lower platform however as a general thing, is only a frame made to support in position the bearings which extend from beneath it and rest on the weighing levers or knife edges. On its upper edge it sustains the springs or spring blocks before named.

The secondary platform and its spring blocks relieve the knife edges or bearings of the weighing levers from the destructive effects of concussion produced by throwing heavy bars of iron or ponderable bodies on the scale.

My invention or improvement and that which I claim as new, is—

The combination of the pivot or bearing frame or primary platform, the blocks of rubber or spring contrivances, and the superior platform with the weighing levers or mechanism; the whole being substantially in the manner and for the purpose as specified.

In testimony whereof I have hereto set my signature this 21st day of August A. D. 1849.

THADDEUS FAIRBANKS.

Witnesses:
 HIRAM KNAPP,
 HORACE FAIRBANKS.